United States Patent [19]

Yoshioka

[11] Patent Number: 4,990,561

[45] Date of Patent: Feb. 5, 1991

[54] WAX COMPOSITION AND PREPARATION METHOD THEREOF

[75] Inventor: Hiroshi Yoshioka, Tokyo, Japan

[73] Assignee: Shin-Etsu Chemical Co., Ltd., Tokyo, Japan

[21] Appl. No.: 467,456

[22] Filed: Jan. 19, 1990

[30] Foreign Application Priority Data

Jan. 20, 1989 [JP] Japan .................................. 1-12266

[51] Int. Cl.$^5$ ............................................. C08K 5/04
[52] U.S. Cl. ..................................... 524/763; 524/850; 524/853; 525/477; 525/479; 424/69; 424/420
[58] Field of Search .................. 524/763, 850, 853; 525/477, 479; 424/69, 420

[56] References Cited

U.S. PATENT DOCUMENTS 4,724,240  2/1988  Abrutyn .............................. 424/69

FOREIGN PATENT DOCUMENTS 2806701  8/1978  Fed. Rep. of Germany ...... 524/853
732280   5/1980  U.S.S.R. ............................. 524/763
529399   11/1940 United Kingdom ............... 524/850

*Primary Examiner*—Melvyn I. Marquis
*Assistant Examiner*—Karen A. Hellender
*Attorney, Agent, or Firm*—Millen, White & Zelano

[57] ABSTRACT

A wax composition prepared by polymerizing a mixture of at least one macromonomer selected from methylpolysiloxane(meth)acrylate macromonomers containing one (meth)acryl group and three of more methylsiloxy groups in a molecule with one or more of a vinyl monomer(s), which is copolymerizable with said macromonomer, to undergo polymerization using a radical producing agent in the presence of both a polysiloxane component (dimethylpolysiloxane and/or methylphenylpolysiloxane) and an organic wax, in which portions of said polysiloxane component, said organic wax and said mixture are controlled to 20-80 pts. wt., 5-75 pts. wt. and 5-50 pts. wt., respectively, to acquire extremely high uniformity and stability while retaining excellent properties inherent in silicone-containing wax compositions.

18 Claims, No Drawings

WAX COMPOSITION AND PREPARATION METHOD THEREOF

FIELD OF THE INVENTION

This invention relates to a wax composition excellent in lubricity and film formability and, more particularly, to a silicone-containing wax composition excellent in uniformity and stability.

BACKGROUND OF THE INVENTION

Dimethylpolysiloxane and methylphenyl-polysiloxane are colorless transparent liquids whose viscosity can be varied over a wide range depending on production conditions, including from low viscosity liquid having a low molecular weight to highly viscous raw rubber-like materials, and what is more, they are excellent in heat resistance, cold resistance, chemical resistance, water resisting property, lubricity, water repelling property, mold releasing facility, defoamability, electric characteristics, and so on. Consequently, they have many industrial uses, e.g., as lubricating oil, a lustering agent, damping oil, electric insulating oil, oil to be injected and impregnated, a cosmetic component, a mold releasing agent, a defoaming agent, an agent for water-repellent treatment, a textile treating agent, an additive for coating materials, an additive for plastics, and so on.

In most of those cases, dimethylpolysiloxane or methyl-phenylpolysiloxane has been used independently. However, each of these polysiloxanes is not only poor in boundary lubricity and durability but also small in surface energy because of its weakness in intermolecular force. Therefore, each suffers from disadvantages of being poor in, e.g., finishing and coating abilities. As one of the methods for obviating such disadvantages, it is known to impart various functions to each polysiloxane by introducing organic groups other than methyl or phenyl group, e.g., polyoxyalkylene groups, alkyl groups containing two or more carbon atoms, ester groups, aralkyl groups, etc., into the siloxane chain.

According to this method, dimethylpolysiloxane and methylphenyl-polysiloxane can acquire new characteristics depending on the substituent groups introduced thereinto, but the introduction of substituent groups causes deterioration of properties inherent in these polysiloxane, e.g., heat resistance, chemical resistance, water-repelling ability, mold releasing facility, electric characteristics, etc.

As another method for removing defects of dimethyl-polysiloxane and methylphenyl-polysiloxane, it is also known to mix them with waxes, fats and oils, organic polymers, or so on. However, polysiloxane polymers have a small value of solubility parameter, so the method has a serious defect in that, since compatiblity with general waxes, fats and oils, organic polymers and so on is difficult, the resulting mixtures lack stability.

As a result of concentrating our energies on a solution for the above-described problems, it has now been found that a remarkably favorable result can be obtained by copolymerizing, with stirring, a dimethyl-siloxane(meth) acrylate macromonomer and one or more of a vinylic polymerizable monomer, which is able to copolymerize with said macromonomer, in the presence of either dimethylpolysiloxane or methylphenyl-polysiloxane, organic waxes and a radical producing agent, thus achieving this invention.

SUMMARY OF THE INVENTION

Therefore, a first object of this invention is to provide a wax composition useful as a lubricant, a lustering agent, a cosmetic component, a water-repelling agent, a mold releasing agent, an additive for coating materials, or an additive for plastics.

A second object of this invention is to provide a method for producing a silicone containing composition excellent in lubricity, adhesiveness, liquid spreading facility, mold releasing facility, glazing ability, water repelling ability, heat resisting property, chemical resistance, water resisting property, durability and finishing ability.

The above-described objects are attained by a wax composition which comprises carring out a polymerization reaction of a mixture of at least one macromonomer selected from methylpolysiloxane(meth)acrylate macromonomers containing one (meth)acryl group and three or more methylsiloxy groups in a molecule with one or more of a vinylic polymerizable monomer(s) which is able to copolymerize with said macromonomers using a radical producing agent in the presence of both a polysiloxane component (that is, dimethylpolysiloxane and/or methylphenyl-polysiloxane) and an organic wax, wherein the polysiloxane component being used in a portion of 20 to 80 parts by weight, the organic wax being used in a portion of 5 to 75 parts by weight, and the mixture being used in a portion of 5 to 50 parts by weight; and a preparation method therefore.

The composition of this invention is extremely useful as a lubricant, a glazing agent, a component of cosmetics, a water repelling agent, a mold releasing agent, an additive for coating materials, or an additive for plastics, and can be prepared with ease.

DETAILED DESCRIPTION OF THE INVENTION

Dimethylpolysiloxane and methylphenyl-polysiloxane, as the primary component of this invention are represented by the formula, $(CH_3)_p(C_6H_5)_q SiO_{(4-p-q)/2}$, and may be any structure; a straight chain, a ring or a branched chain.

In the foregoing formula, p and q satisfy the relationship, $1 \leq p \leq 3$, $0 < q < 1.7$, and $1.5 < p+q \leq 3$.

This component may be a mixture of two or more of the polysiloxanes, though represented by the foregoing formula, which are different in molecular formula and/or molecular weight from each other, and may be properly chosen widely from those with low viscosity of 1 centi stokes or less to raw rubber-like ones having a high molecular weight depending on the end-use purpose of the wax composition.

An organic wax as the secondary component of this invention is, a side from the chemical definition thereof, intended to include natural and synthetic organic solid or liquid matters which can be generally used as lustering agents, lubricants, raw materials for cosmetics and medicines, packing materials, coating materials for electric parts, sizing agents for textile and leather, or raw materials for grease.

As examples of such organic waxes, mention may be made of those of animal origin, such as beeswax, wool wax, sperm oil, arctic sperm oil, beef tallow, squaran, etc., those of vegetable origin, such as carnauba wax, Japan wax, cotten wax, castor oil, etc., those of petroleum origin, such as montan wax, paraffin wax, petrolatum, microcrystalline wax, etc., and synthetic polyethylene wax.

The tertiary component of this invention is a comb-form copolymer prepared by copolymerizing a mixture of at least one macromonomer selected from methyl-polysiloxane-(meth)acrylate macromonomers having one(meth)acrylate group and three or more methylsiloxy groups in a molecule and one or more of a vinylic polymerizable monomer which is able to copolymerize with said macromonomers.

In order to prepare the composition which has excellent stability without attendant deterioration in compatibility, it is to be desired that a fraction of the said methylpolysiloxane-(meth)acrylate macromonomer in the comb-form copolymer should be controlled to 5 to 90 wt %. Herein, so long as it has one (meth)acrylate group and three or more methyl siloxy groups, the methylpolysiloxane(meth)acrylate macromonomer does not have any other particular limitation. Representatives of such micromonoers can be represented by the following general formula (I):

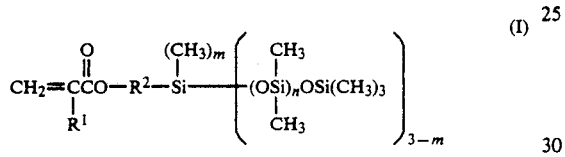
(I)

wherein $R^1$ represents a hydrogen atom or a methyl group; n represents an average degree of polymerization, and ranges from 0 to 200; m represents 0, 1 or 2; and $R^2$ represents a divalent hydrocarbon residue containing 1 to 6 carbon atoms, between carbon atoms of which an oxgen atom may be inserted.

The compounds represented by the foregoing general formula (I) can be synthesized by reacting (meth)acrylate-containing chlorosilane compounds with living polymers prepared by anionic polymerization of cyclic siloxanes disclosed in JP-Kokai-59-126478 (The term "JP-Kokai" as used herein means "unexamined Japanese patent publication").

Specific examples of the compounds represented by the foregoing general formula (I) are illustrated below.

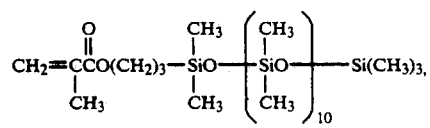

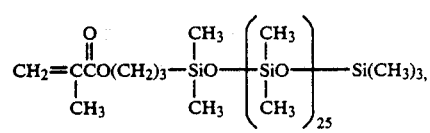

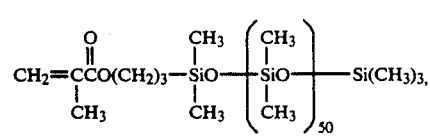

-continued

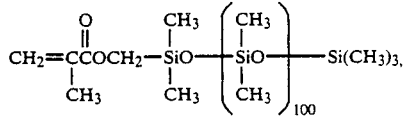

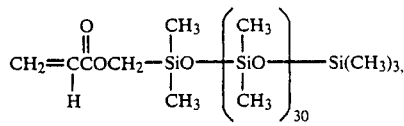

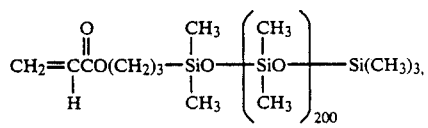

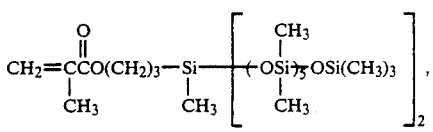

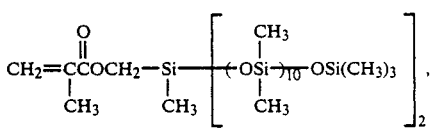

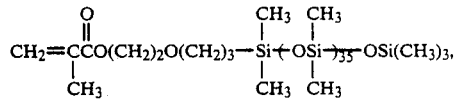

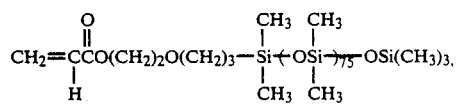

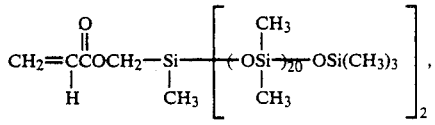

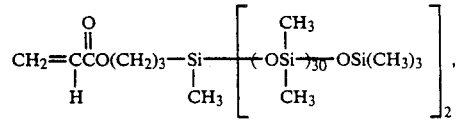

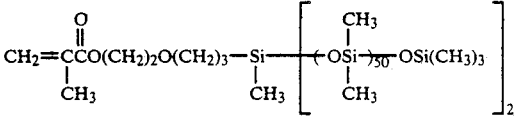

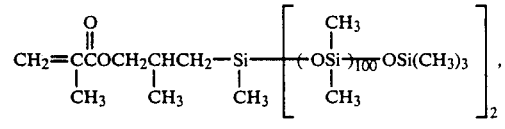

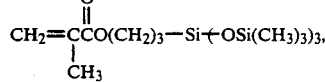

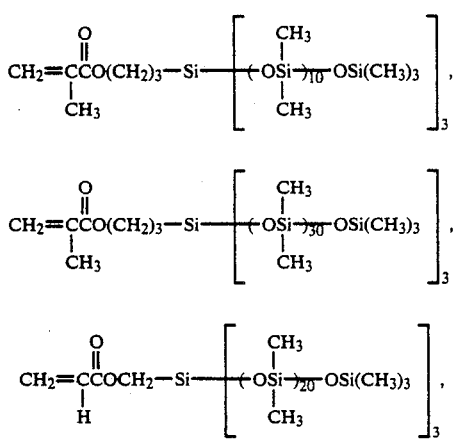

Specific examples of vinylic polymerizable monomers which can be copolymerized with methyl-polysiloxaneacrylate macromonomers as illustrated above include methacrylates such as methylmethacrylate, ethylmethacrylate, butylmethacrylate, hexylmethacrylate, 2-ethylhexylmethacrylate, octylmethacrylate, decylmethacrylate, dodecylmethacrylate, tridecylmethacrylate, octadecylmethacrylate, 2-hydroxyethylmethacrylate, 3-hydroxypropylmethacrylate, methacrylates containing a perfluoroalkyl group of 1 to 8 carbon atoms, trimethoxysilylpropyl-methacrylate, dimethoxymethylsilylpropylmethacrylate, etc., acrylates such as methylacrylate, ethylacrylate, propylacrylate, butylacrylate, hexylacrylate, 2-ethylhexylacrylate, octylacrylate, decylacrylate, dodecylacrylate, tridecylacrylate, 2-hydroxyethylacrylate, 3-hydroxypropylacrylate, trimethoxysilyl-propylacrylate, etc., styrene, styrene derivatives such as α-methylstyrene, etc., vinyl esters such as vinyl acetate, vinyl propionate, vinyl caproate, vinyl laurate, vinyl versate, etc., methacrylic acid, acrylic acid, methacrylic acid amide, acrylic acid amide, maleic anhydride, acrylonitrile, butadiene, and so on.

These copolymerizable vinyl monomers can be used alone or as a mixture of two or more thereof.

The wax composition of this invention can be obtained by copolymerizing the raw materials of the tertiary component, that is, a methylpolysiloxane(meth)acrylate macromonomer and a vinyl monomer copolymerizable to said macromonomer, in the presence of dimethylpolysiloxane and/or methylphenylpolysiloxane as the primary component, an organic wax as the secondary component and a radical producing agent while vigorously stirring the reactant mixture at a temperature higher than the melting point of the organic wax as the secondary component.

In the copolymerization, the radical producing agent is used in an amount of 0.05 to 5.0 parts by weight per 100 parts by weight of methylpolysiloxane(meth)-acrylate macromonomer and vinylic polymerizable monomer.

As examples of radical producing agents usable therein, benzoyl peroxide, butylperbenzoate, methyl ethyl ketone peroxide, dicumyl peroxide, t-butyl hydroperoxide, 2,2'-azobis-isobutyronitrile, 2,2'-azobisisovaleronitrile, 2,2'-azobis-(2,4-dimethyl-valeronitrile) and so on can be given.

The above-described polymerization reaction may be carried out using either method, one which comprises placing the above-described three components and radical producing agent in a reaction vessel and keeping the reaction system at a prescribed temperature with stirring, or one which comprises placing the primary component, the secondary component and the radical producing agent in a reaction vessel, adding thereto dropwisely the tertiary component, that is, the mixture of the macromonomer and the vinylic polymerizable monomer, while keeping the reaction system at a prescribed temperature with stirring, and ripening the reaction product as the same condition is kept. In either case, however, it is necessary to perform powerful stirring.

For instance, when the reaction is carried out on a general flask scale of 5 liter or less, it is necessary to agitate the reaction mixture with stirring blades at more than 200 r.p.m., preferably at more than 300 r.p.m.

Also, the use of a homogenizer is favored in effecting powerful stirring.

A reaction temperature, as described above, is chosen from temperatures which are higher than the melting point of the organic wax as the secondary component, and that within the range where the radical producing agent can function effectively. It ranges generally from 50° C. to 200° C., preferably from 70° C. to 150° C. In such cases, the reaction can be completed in 30 minutes–15 hours. However, after the completion of the reaction, it is necessary for the reaction mixture to be cooled to room temperature as the stirring is continued, and then to isolate the produced composition.

The thus obtained composition of this invention has very high stability. High stability like this is presumed to originate from the function of the comb-form copolymer, which is prepared from the methylpolysiloxane(-meth)acrylate macromonomer and the vinylic polymerizable monomers, as a compatibility creating agent. More specifically, it can be speculated that since on the individual surfaces of organic wax particles the comb-form copolymer exists in such a condition that its organic groups represented by (meth)acrylate group may orient in the inner direction and, on the other hand, its methylsiloxane groups may orient in the outer direction, it comes to have a conformation excellent in affinity for dimethylpolysiloxane and methylphenylpolysiloxane, whereas on the individual surfaces of dimethylpolysiloxane and methylphenylpolysiloxane particles the comb-form copolymer can have a conformation excellent in affinity for the wax since it exists thereon with its dimethylsiloxane chains inwards and its organic groups outwards.

In preparing the composition of this invention, it is effective for enhancement of quality, e.g., as cosmetics or so on, to strip the unreacted vinyl monomers under high degree of vacuum as the stirring and the heating are continued after the completion of the polymerization reaction, and that before cooling.

For the purpose of making improvements in various characteristics of the composition, appropriate components, other than the above-described essential components, can also be added.

As examples of such additional components, mention may be made of diluting agents represented by esters such as dioctyl phthalate, butyl stearate, isopropyl myristate, etc., odor absorption preventing agents such as tocopherol, phytic acid, etc., coloring pigments, fillers, antioxidants, perfume, ultraviolet absorbents, and so on.

In accordance with this invention, an extremely uniform and stable composition is effected by incorporating comb-form copolymers prepared from a methylpolysiloxane(meth)acrylate macromonomer and vinylic polymerizable monomers as a compatibility imparting agent into a composition which comprises dimethylpolysiloxane and/or methylphenylpolysiloxane and organic waxes, which are incompatible with each other, and, therefore, has so far failed in acquirement of stability. Accordingly, the composition of this invention can acquire concurrently various kinds of excellent properties regarding lubricity, adhesiveness, liquid spreading facility, mold releasing facility, glazing ability, water repelling ability, heat resistance, chemical resistance, water resistance, finishing ability and so on, which have not been realized by independent use of dimethylpolysiloxane and/or methylphenylpolysiloxane and organic waxes.

EXAMPLES

This invention will now be illustrated in more detail by reference to the following examples. However, the invention should not be construed as being limited to these examples.

Example 1

In a glass-made reactor equipped with stirring blades, a thermometer, a reflux condenser, a dropping funnel and a nitrogen gas admitting tube, 300 g of dimethylpolysiloxane having a viscosity of 6 centi stokes at 25° C. (KF-96, 6 cs; trade name of products manufactured by Shin-Etsu Chemical Co., Ltd.), 120 g of microcrystalline wax having a melting point of 91° C. (Bi-Square 195; trade name of products manufactured by Petrolite Co.) and 0.5 g of t-butylperbenzoate (Perbutyl Z, trade name of products manufactured by Nippon Oils & Fats Co., Ltd.) were placed, and the stirring at 600 r.p.m. was continued while the temperature inside the reactor was kept at 120° C. using an oil bath and nitrogen gas was admitted thereinto.

Separately, 50 g of methylmethacrylate, 15 g of 2-ethylhexylacrylate and 35 g of dimethylpolysiloxanemethacrylate macromonomer illustrated by the following formula were mixed thoroughly.

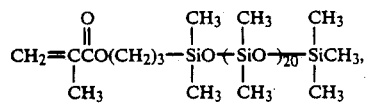

This mixture was added dropwise to the foregoing stirred mixture through the dropping funnel over 30 minutes period.

After the dropwise addition, the reaction mixture was ripened for 4 hours as the inside temperature and the stirring condition were maintained. Then, the reflux condenser was replaced by a Claisen head, and the stripping was carried out for 2 hours under reduced pressure of 20 mmHg as the inside temperature and the stirring condition were maintained. After the conclusion of the stripping, the oil bath was taken off, and the reaction product was cooled to room temperature with stirring. Thus, 504 g of a milky white, uniform, creamy composition was obtained. This composition had JIS-2220 consistency of 386, and any changes of uniformity and consistency were not caused therein by one month's storage at 50° C. An 1 gram portion of the composition was coated on a piece of leather (cow), 10 cm by 10 cm, so as to rub it into the leather. In this case, the composition spread over the leather in a very good manner and a lustrous, desired surface was obtained by this processing.

A contact angle of ion exchange water on the processed surface was 97°. Moreover, a coefficient of kinematic friction and a critical surface tension of the surface formed by coating this composition on a SUS test panel at a coverage of 2 g/m$^2$ was 0.11 and 22.3 dyn/cm, respectively.

Making an additional remark, the measurement of the coefficient of kinematic friction was performed using a DFPM meter made by Kyowa kaimen Kagaku K.K. under the condition that a SUS ball was used as a rubbing element, a load imposed on the rubbing element was 200 g, and a head speed was set at 50 cm/min.

Further, as the result of rubbing the composition into the back of the hand, not only sufficient spreadability but also a stickiness-free, reflesh feeling was obtained and, what is more, very good appearance was presented. From the applications described above, it is clear that the composition is able to be most appropriately used for a lubricant, a mold releasing agent, a leather or texture processing agent, a water repelling agent and cosmetics, e.g., cream, foundation, lipstick, etc.

Comparative Example 1

In the same glass-made reactor used in Example 1, 100 g of toluene and 0.5 g of 2,2'-azobisisobutyronitrile were placed, and therethrough a nitrogen gas was passed. Thereafter, a temperature inside the reactor was kept at 90° C. using an oil bath. Separately, 50 g of methylmethacrylate, 15 g of 2-ethylhexylacrylate, 35 g of the same dimethylpolysiloxanemethacrylate macromonomer as used in Example 1 and 0.5 g of 2,2'-azobisisobutyronitril e were mixed thoroughly. The resulting mixture was added in dropwise to the stirred toluene over 30 minutes period through a dropping funnel. Then, the reactant solution was ripened for 5 hours as the temperature inside the reactor was maintained as described above. Thus, a toluene solution of comb-form copolymer of dimethylpolysiloxanemethacrylate was obtained.

To this toluene solution, 300 g of dimethylpolysiloxane having a viscosity of 6 cs at 25° C. and 120 g of microcrystalline wax having a melting point of 91° C. were added, and dissolved therein under reflux of toluene. Thereafter, the inside temperature was lowered to 80° C., and a stripping treatment was carried out under reduced pressure of 20 mmHg over a 2 hour period in order to remove the toluene and unreacted remaining monomer.

After the conclusion of the stripping, the reaction product was cooled to room temperature with stirring. On standing for one hour at room temperature, the product separated into two layers, that is to say, the intended uniform composition was not obtained.

Examples 2 to 10

Under the same condition as in Example 1, different kinds and amounts of organopolysiloxanes, organic waxes, dimethylpolysiloxane(meth)acrylate macromonomers and vinylic polymerizable monomers, as set forth in Table 1, were treated to prepare compositions corresponding to examples 2 to 10, respectively.

Physical properties of each composition, and evaluation made by the measurement under the same condition as in Example 1 are shown together in Table 1.

TABLE 1

| Example No. | Organopoly-siloxane | Organic Wax | Methylpoly-siloxane-(meth)acrylate Macromonomer | Vinylic polymerizable Monomer | | Radical polymerization Initiator (Butylperbenzoate) | JISK-2220 Consistency | Change on One-month Standing at 50° C. | Contact Angle on Processed Surface of Leather (°) | Coefficient of Kinematic Friction on SUS Board |
|---|---|---|---|---|---|---|---|---|---|---|
| 2 | KF-96, 6 cs 150 g | *6 20 g | P(n=20) 35 g | MMA 2-HEA | 35 g 30 g | 0.5 g | 410 | zero | 95 | 0.14 |
| 3 | KF-96, 6 cs 150 g | *6 20 g | P(n=20) 40 g | MMA 2-HEMA | 30 g 30 g | 0.5 g | 399 | zero | 92 | 0.12 |
| 4 | *1 150 g | *6 75 g | P(n=50) 35 g | MMA 2-HEA | 45 g 20 g | 0.5 g | 186 | zero | 90 | 0.11 |
| 5 | *2 300 g | *6 180 g | P(n=50) 35 g | MMA BMA | 50 g 15 g | 0.5 g | 274 | zero | 96 | 0.11 |
| 6 | *3 300 g | *7 180 g | M(n=20) 30 g | MMA BMA | 55 g 15 g | 0.5 g | 119 | zero | 95 | 0.16 |
| 7 | *4 550 g | *6 100 g *7 250 g | P(n=20) 35 g | MMA 2-HEA | 50 g 15 g | 0.7 g | 46 | zero | 98 | 0.14 |
| 8 | KF-96, 6 cs 575 g | *6 97.5 g *7 227.5 g | P(n=20) 35 g | MMA 2-HEA | 45 g 20 g | 0.7 g | 107 | zero | 96 | 0.14 |
| 9 | *3 300 g | *8 75 g | P(n=50) 35 g | MMA TDMA | 45 g 20 g | 0.5 g | 242 | zero | 91 | 0.12 |
| 10 | *5 300 g | 75 g | P(n=100) 35 g | MMA 2-HEA | 45 g 20 g | 0.5 g | 201 | zero | 93 | 0.14 |

The reference marks in Table 1 shown above signify the following substances:

*1: Decamethylpentacyclosiloxane (KF-995; trade name, produced by Shin-Etsu Chemical Co., Ltd.)

*2: Dimethylpolysiloxane with viscosity of 100 cs (KF-96, 100 cs; trade name, produced by Shin-Etsu Chemical Co., Ltd.)

*3: Dimethylpolysiloxane with viscosity of 20 cs: (KF-96, 20 cs; trade name, produced by Shin-Etsu Chemical Co., Ltd.)

*4: Octamethyltetracyclosiloxane (KF-994, trade name; produced by Shin-Etsu Chemical Co., Ltd.)

*5: Methylphenylpolysiloxane (KF-50, 100 cs; trade name, produced by Shin-Etsu Chemical Co., Ltd.)

*6: Microcrystalline wax (Bi-Square 195; trade name, produced by Petrolite Co., Ltd.)

*7: Polyethylene wax (Baleco 655; trade name, produced by Petrolite Co., Ltd.)

*8: Selesin wax (Selesin 810; trade name, produced by Toyo Ink Mfg. Co., Ltd.)

MMA: Methylmethacrylate
2-HEA: 2-Ethylhexylacrylate
2-HEMA: 2-Ethylhexylmethacrylate
TDMA: tridecylmethacrylate P:
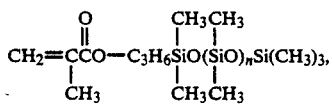

M:
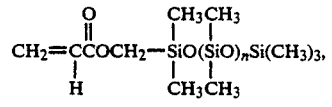

The results shown in Table 1 prove that the compositions of this invention prepared in accordance with the method of this invention are highly uniform and quite stable and, what is more, excellent in water-repelling property and lubricity.

What is claimed is:

1. A wax composition prepared by polymerizing a mixture of at least one macromonomer selected from methylpolysiloxane(meth)acrylate macromonomers containing one (meth)acryl group and three or more methylsiloxy groups in a molecule with one or more of a vinylic polymerizable monomer(s) which is able to copolymerize with the macromonomers using a radical producing agent in the presence of a dimethylpolysiloxane and/or methylphenylpolysiloxane together with an organic wax, in which said dimethylpolysiloxane and/or methylphenylpolysiloxane is from 20 to 80 parts by weight, that of said organic wax is from 5 to 75 parts by weight, and that of the mixture comprizing the macromonomer and the vinylic polymerizable monomer is from 5 to 50 parts by weight.

2. The wax composition of claim 1, wherein the dimethylpolysiloxane has a straight chain structure.

3. The wax composition of claim 1, wherein the dimethylpolysiloxane has a ring structure.

4. The wax composition of claim 1, wherein the dimethylpolysiloxane has a branched chain structure.

5. The wax composition of claim 1, wherein the methylphenylpolysiloxane has a straight chain structure.

6. The wax composition of claim 1, wherein the methylphenylpolysiloxane has a ring structure.

7. The wax composition of claim 1, wherein the methylphenylpolysiloxane has a branched chain structure.

8. The wax composition of claim 1, wherein the dimethylpolysiloxane is a mixture of two or more dimethylpolysiloxanes having different molecular structures and/or different molecular weights from each other.

9. The wax composition of claim 1, wherein the methylphenylpolysiloxane is a mixture of two or more methylphenylpolysiloxane(s) having different molecular structures and/or different molecular weights from each other.

10. The wax composition of claim 1, wherein the organic wax is at least one selected from a group consisting of a beeswax, woolwax, sperm oil, arctic sperm oil, beef tallow, squaran, carnauba wax, Japan wax, cotten wax, montan wax, paraffin wax, petrolatum, microcrystalline wax and synthetic polyethylene wax.

11. The wax composition of claim 1, wherein a comb-form copolymer is produced by the copolymerization of the macromonomers with the vinylic polymerizable monomer(s).

12. The wax composition of claim 11, wherein the the macromonomer content in the comb-form copolymer is 5-90 wt %.

13. A method of preparing a wax composition, which is comprised of a process of polymerizing 5 to 50 parts by weight of a mixture of at least one macromonomer selected from methylpolysiloxane(meth)acrylate macromonomers containing one (meth)acryl group and three or more methylsiloxy groups in a molecule with one or more of a vinylic polymerizable monomer(s) which is able to copolymerize with the macromonomers, by stirring in a mixture of 20 to 80 parts by weight of a dimethylpolysiloxane and/or methylphenylpolysiloxane, 5 to 75 parts by weight of an organic wax, and a radical producing agent.

14. The method of claim 13, wherein an amount of radical producing agent is 0.05-5.0 parts by weight per 100 parts by weight of methylpolysiloxane(meth)acrylate macromonomer(s) and vinylic polymerizable monomer(s).

15. The method of claim 13, wherein a reaction temperature is 50° C.-200° C.

16. The method of claim 13, wherein the stirring is carried out in a condition of at least 200 rpm.

17. The method of claim 13, wherein the stirring is carried out by a homogenizer.

18. The method of claim 13, wherein any unreacted vinylic polymerizable monomer is stripped off from the reaction mixture after completion of the copolymerization reaction but before cooling the reaction mixture.

* * * * *